Patented Dec. 3, 1935

2,023,368

UNITED STATES PATENT OFFICE 2,023,368

PRODUCTION OF BUTYL ALCOHOL BY FERMENTATION

David A. Legg, Terre Haute, Ind., assignor to Commercial Solvents Corporation, Terre Haute, Ind., a corporation of Maryland No Drawing. Application November 28, 1932, Serial No. 644,691

8 Claims. (Cl. 260—135)

The present invention relates to the production of butyl alcohol and other valuable products by the fermentation of carbohydrate-containing mashes. More particularly, the present invention relates to the utilization in a subsequent fermentation of the distillery slop from a previous butyl alcohol fermentation.

It is well known that butyl alcohol, together with other products such as ethyl alcohol and acetone and/or iso-propyl alcohol may be produced by the fermentation of carbohydrate mashes by means of butyl alcohol producing organisms such as B. amylobacter, Clostridium acetobutylicum (Weizmann), etc. For example, the common commercial method for the production of butyl alcohol by fermentation consists in subjecting a starch mash such as maize mash to the action of Clostridium acetobutylicum (Weizmann). The average mash for this type of fermentation contains from 5 to 10% of carbohydrate, and at the completion of the fermentation there always remains a small percentage, for example from 0.25 to 1.00% of unfermented carbohydrate material, together with a certain amount of nitrogenous material, bacterial metabolic by-products, cell degradation products, etc. This material remains as a dilute solution or suspension after the solvents have been recovered by distillation, and is commonly known as "slop".

The disposal of this slop has presented a problem which has hitherto been unsolved. The solid content of the material is so low that concentration by evaporation or like methods has been found to be economically undesirable, even in view of possible uses of the concentrated material as stock food, etc. Furthermore, the disposal of this material as sewage presents a serious problem since in spite of its low solid content the "biological oxygen demand" of the slop from a single fermentation plant often exceeds that of the domestic sewage from a city of many hundreds of thousands population.

Previously, it had never been thought to be possible to utilize the slop in making up mash for subsequent fermentations in view of the well known inhibitory effect of the metabolic by-products of the growth of micro-organisms upon subsequent growth of the same organisms. This effect has been termed "isantagonism" by Eijkman (Zentralblatt für Bakteriologie, Parasitenkunde und Infektionskrankheiten, Abteilung I, 35, 1–3) and has been noted by numerous bacteriologists as applying to various different types of bacteria. It has been shown, for example, to apply to Bact. coli, Bact. typhosum, Micrococcus ovalis, Vibrio choleræ, Vibrio metchnikovii, Pseudomonas fluorescens, and Bact. dysenteriæ (Eijkman, loc. cit.; Rahn, Zentralblatt für Bakteriologie, Parasitenkunde und Infektionskrankheiten, Abteilung II, 16, 417; Upton, Journal of Bacteriology 17, 315; Lal, Indian Journal of Medical Research Calcutta, 8, 731).

However, the surprising discovery has now been made that in the butyl alcohol fermentation the slop can be utilized not only in the succeeding fermentation, but successively for a plurality of times. It is apparent that when this re-use of the slop is employed a considerable number of advantages ensue. It is possible to utilize somewhat higher concentrations of carbohydrate material in the mash since any unfermented material may in this way be again subjected to the action of the bacteria instead of thrown away as in the previous procedure. Water and steam consumption are materially reduced. The unfermentable solid content of the slop is built up to a concentration which makes disposal feasible either by sewage disposal processes or by recovering the solid matter by evaporation or the like. It has further been found that the re-use of slop surprisingly reduces the foaming in the fermenters, making possible the use of a larger volume of mash in each vessel. This latter advantage in itself amounts to a considerable economic advantage, since the amount of solvents produced per unit of equipment is materially increased. In addition to these advantages there is secured in some cases a marked increase in yield which of course makes the process even more desirable from an economic standpoint.

It has also been discovered that when slop is re-used in the butyl fermentation process, improved results are obtained by utilizing cultures which have been "acclimated" to the presence of slop. Such cultures may be prepared, for example, by subcultivating in successive mashes containing increasing amounts of slop. By the use of such cultures slop may be employed in concentrations up to 300%. i. e., recycling 100% three successive times, with marked improvement in yield. Under the same conditions, the use of normal unacclimated cultures secures good fermentation, with most of the advantages discussed above, but does not in general secure the improved yield obtained with the acclimated cultures.

As still further improvement has been found to consists in at least partially neutralizing the sop before recycling. This has been found to increase materially the yields in certain cases.

While the process of the present invention may be said to be applicable to the butyl alcohol fermentation generally, it is especially adapted to be employed in conjunction with the fermentation of starch mashes by means of *Clostridium acetobutylicum* (Weizmann). For purposes of illustration, therefore, the following specific examples will deal with this fermentation. The slop obtained from the fermentation of a maize mash by this type bacteria is a turbid liquid, somewhat acid in reaction, having a solid content of about 1%. The acidity usually ranges from 2.0 to 4.0 c. c. of N/10 acid per 10 c. c. of slop, this acid consisting principally of volatile acids such as acetic and butyric. The following is an approximate analysis of a representative sample of such slop obtained by the fermentation of a 7.25% degerminated maize mash:

| | |
|---|---|
| Total dry matter, per 100 c. c. | 2.27 gm. |
| Soluble matter, per 100 c. c. | 0.732 gm. |
| Insoluble matter, per 100 c. c. | 1.537 gm. |

Composition of dry matter

| | Per cent |
|---|---|
| Proteins | 0.0 |
| (All hydrolyzed) | |
| Polypeptides | 16.0 |
| Amino acids | 24 |
| Dextrins, sugars | 42 |
| Ash | 12 |
| Ammonium salts | Trace |

Slop of this general composition was employed in the fermentations of the following examples, and was successfully recycled in the methods outlined in these examples.

*Example I*

An 8% maize mash was prepared and fermented in the usual manner, (as for example, by the methods disclosed in U. S. Patents Nos. 1,315,585; 1,385,888; 1,668,819; 1,818,782; 1,875,536; etc.) and in succeeding fermentations 30% of slop was substituted for water in preparing the mashes. The average of a large number of fermentations showed an increase in yield of solvents of about 1% (on the weight of the maize) over that obtained in parallel fermentations in which no slop was recycled.

*Example II*

A mash of 9% carbohydrate concentration consisting of 85% degerminated maize meal and 15% hydrol (the mother liquor from the crystallization of corn sugar) was prepared and fermented in the usual manner. For the succeeding fermentation the mash was prepared with slop from the previous fermentation instead of water. The average results of a large number of fermentations showed no appreciable increase in yield over those prepared with water instead of slop, but foaming was reduced, the solid content of the slop was built up, and the other advantages previously discussed were obtained.

*Example III*

The fermentations were carried out as in Example II with the exception that the slop for making up the mash for the second series of fermentations was partially neutralized with approximately 0.06% of hydrated lime (on the weight of the slop). The average of a number of fermentations showed an increase in yield of approximately 0.3% on the weight of the maize in addition to the other advantages obtained in Example II.

*Example IV*

A whole maize mash of 7.5% concentration was prepared and fermented in the usual manner. Three successive fermentations were then carried out in which the slop was completely recycled (giving a slop concentration of 300% in the final fermentation) and in which the inoculant used was developed in the following manner:

1st generation, tubes of 6.5% mash with 20% slop

2nd generation, tubes of 6.5% mash with 40% slop

3rd generation, tubes of 6.5% mash with 60% slop

4th generation, flasks of 7.5% mash with 80% slop

5th generation, flasks of 7.5% mash with 100% slop

An average of a large number of fermentations showed an increase in yield of about 1% on the weight of the maize over parallel fermentations of mash containing no slop and fermented by either normal or acclimated cultures.

It is to be definitely understood that the above examples are illustrative only, and do not in any way limit the scope of this invention. Butyl alcohol-producing organisms other than *Clostridium acetobutylicum* (Weizmann) may be employed, and the mashes may be varied in any way known to those skilled in the art. The concentrations of slop utilized may be varied within considerable limits without departing from the concept of this invention. It is preferred to use slop concentrations between 10% and 300%, but higher concentrations may often be employed without encountering any difficulties. It is to be understood, of course, that when the slop concentration is referred to in percent, both here and in the appended claims, this concentration may be attained in the usual manner of successively recycling the slop, or it may be obtained by other means, such as the use of slop concentrates, or the use of slop fortified by the settled solids from other slop.

With regard to the partial neutralization of the slop, it is to be understood that this may be accomplished by means of any known neutralizing agents in addition to those specifically mentioned in the examples, but it is naturally preferred to use only such as have or produce no particularly toxic effect upon the microorganism employed to bring about the fermentation. Also, the slop or the resulting mash may be neutralized to any point such that the pH of the mash is within the operative range for the organism employed. It is preferred, however, to adjust the pH of the slop-containing mashes to approximately that of the corresponding mash containing no slop.

With regard to the acclimation of cultures, it is to be understood that the particular method of the cited example is not to be taken as limiting the invention. Any method may be employed which brings the culture successively in contact with increasing concentrations of slop. In general, it may be said that the use of equivalents, and the use of such modifications of procedure as would naturally occur to one skilled in the art, are to be considered as coming within the scope of this invention.

The invention now having been described, what is claimed is:

1. In a process for the production of butyl alcohol by the action of butyl alcohol-producing bacteria on a fermentable carbohydrate mash, the improvement which comprises incorporating in such mash distillation slop from a previous fermentation by said bacteria and fermenting the resulting mixture.

2. In a process for the production of butyl alcohol by the action of butyl alcohol-producing bacteria on a fermentable carbohydrate mash, the improvement which comprises incorporating in such mash from 10% to 300% of distillation slop from a previous fermentation by said bacteria and fermenting the resulting mixture.

3. In a process for the production of butyl alcohol by the action of *Clostridium acetobutylicum* (Weizmann) on a fermentable carbohydrate mash, the improvement which comprises incorporating in such mash distillation slop from a previous fermentation by said bacteria and fermenting the resulting mixture.

4. In a process for the production of butyl alcohol by the action of *Clostridium acetobutylicum* (Weizmann) on a fermentable carbohydrate mash, the improvement which comprises incorporating in such mash from 10% to 300% of distillation slop from a previous fermentation by said bacteria and fermenting the resulting mixture.

5. In a process for the production of butyl alcohol by the action of butyl alcohol-producing bacteria on a fermentable carbohydrate mash, the improvement which comprises incorporating in such mash at least partially neutralized distillation slop from the primary distillation of a previous fermentation by said bacteria and fermenting the resulting mixture.

6. In a process for the production of butyl alcohol by the action of *Clostridium acetobutylicum* (Weizmann) on a fermentable carbohydrate mash, the improvement which comprises incorporating in such mash at least partially neutralized distillation slop from the primary distillation of a previous fermentation by said bacteria and fermenting the resulting mixture.

7. In a process for the production of butyl alcohol by the action of butyl alcohol-producing bacteria on a fermentable carbohydrate mash, the improvement which comprises incorporating in such mash distillation slop from a previous fermentation by said bacteria and fermenting the resulting mash with a culture of said bacteria previously grown for a plurality of generations in the presence of such slop.

8. In a process for the production of butyl-alcohol by the action of *Clostridium acetobutylicum* (Weizmann) on a fermentable carbohydrate mash, the improvement which comprises incorporating in such mash distillation slop from a previous fermentation by said bacteria and fermenting the resulting mash with a culture of said bacteria previously grown for a plurality of generations in the presence of such slop.

DAVID A. LEGG.